United States Patent [19]

Walker

[11] Patent Number: 4,715,325
[45] Date of Patent: Dec. 29, 1987

[54] POLLUTION CONTROL THROUGH FUEL TREATMENT

[76] Inventor: Claud W. Walker, Rte. 2, Box 201, Portales, N. Mex. 88130

[21] Appl. No.: 876,226

[22] Filed: Jun. 19, 1986

[51] Int. Cl.$^4$ .............................................. F02B 75/12
[52] U.S. Cl. ..................................... 123/1 A; 123/538
[58] Field of Search .................... 123/1 A, 3, 538, 537

[56] References Cited

U.S. PATENT DOCUMENTS

| | | | |
|---|---|---|---|
| 3,448,034 | 6/1969 | Craft | 204/197 |
| 3,486,999 | 12/1969 | Craft | 204/197 |
| 3,597,668 | 8/1971 | Yoshimine | 317/262 |
| 3,717,129 | 2/1973 | Fox | 123/1 A |
| 4,050,426 | 9/1977 | Sanderson | 123/538 |
| 4,074,670 | 2/1978 | Roberts | 123/538 |
| 4,088,450 | 5/1978 | Kosaka | 123/3 |
| 4,173,206 | 11/1979 | Masaki | 123/538 |
| 4,256,060 | 3/1981 | Kelly | 123/3 |
| 4,373,494 | 2/1983 | McMahon | 123/538 |
| 4,429,665 | 2/1984 | Brown | 123/1 A |
| 4,460,516 | 7/1984 | Kapitanov et al. | 123/537 |
| 4,475,484 | 10/1984 | Filho et al. | 123/1 A |
| 4,517,926 | 5/1985 | Reinhard | 123/3 |
| 4,590,914 | 5/1986 | Rosky et al. | 123/3 |

*Primary Examiner*—E. Rollins Cross
*Attorney, Agent, or Firm*—Marcus L. Bates

[57] ABSTRACT

Fuel for an internal combustion engine is treated by flowing the fuel into intimate contact with a crystalline metal alloy that includes copper, zinc, nickel, lead, tin, iron, antimony sulfur, and manganese all in a specific range of percentage composition. The fuel can be any hydrocarbon including diesel, regular gasoline, low lead gasoline, aviation fuel, propane and butane. The crystalline metal is essentially non-sacrificial and will last hundreds of thousands of miles under ordinary conditions of usage. The crystalline metal alloy is contained within a housing through which fuel flows, whereby the fuel is placed in intimate contact with the surface area of the crystalline metal alloy, causing significant reduced pollution and increased mileage.

18 Claims, 10 Drawing Figures

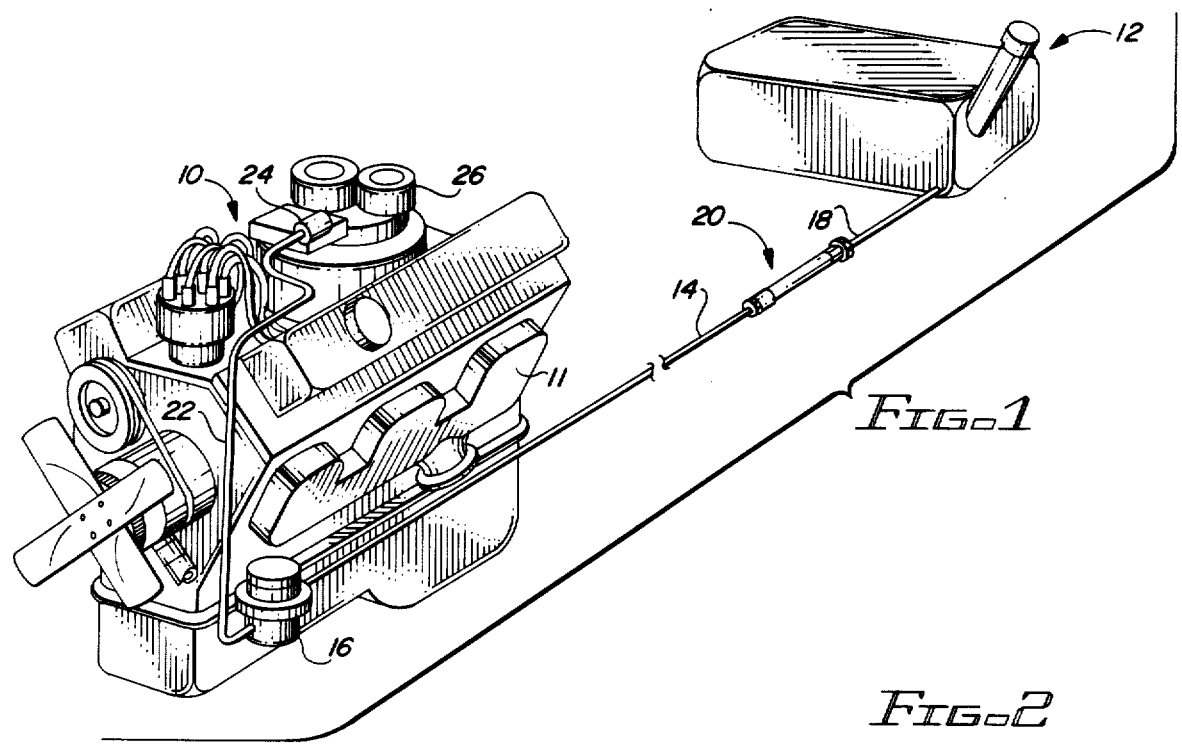
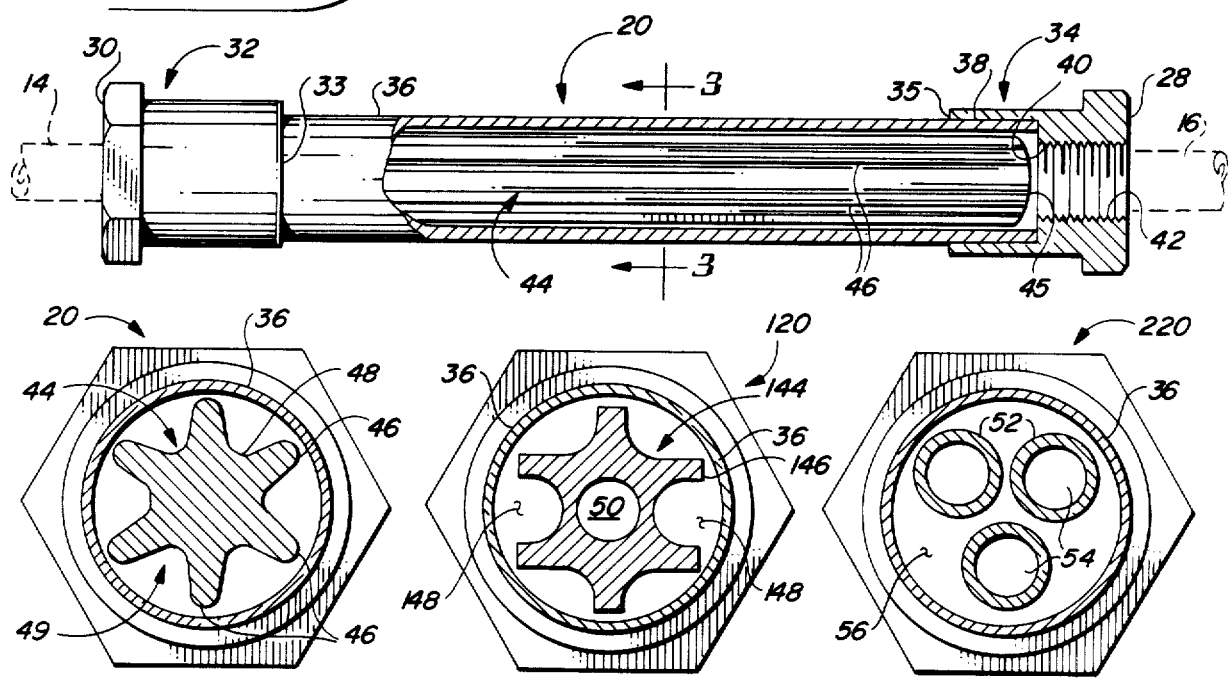
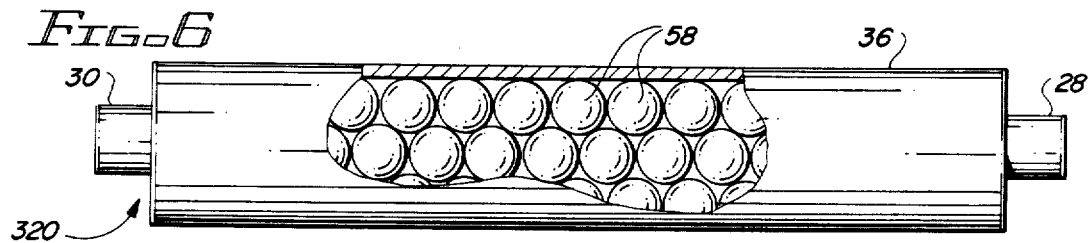

POLLUTION CONTROL THROUGH FUEL TREATMENT

BACKGROUND OF THE INVENTION

There are many prior art references indicating that the physical characteristics of a flowing liquid is changed or modified by contact with a particular alloy. The explanation for the change in behavior of the flowing hydrocarbon is usually attributed to polarization of the molecules, or a change in electrostatic potential of the flowing hydrocarbon molecules. Craft U.S. Pat. Nos. 3,448,034 and 3,486,999 set forth a stabilizing element having a core contained within a housing. In Craft U.S. Pat. No. 3,448,034, the core is comprised of the following mixture:

|  | Percent by weight: |
|---|---|
| Copper | 57.64 |
| Zinc | 17.63 |
| Nickel | 13.45 |
| Lead | 7.66 |
| Tin | 2.69 |
| Iron | .69 |
| Antimony | .12 |
| Sulfur | .07 |
| Manganese | .05 |

The above mixture provides a crystalline structure of non-conductive characteristics which is non-sacrificing in use. The core is arranged along the longitudinal axis of a housing so that liquid flowing into and out of the housing is placed in contact with the surface of the core. The core has a polarizing effect on liquids flowing through the housing and prevents precipitation of minerals in solid form from being deposited on the tubing walls and other surfaces that come in contact with the flowing liquid downstream of the housing.

Craft U.S. Pat. No. 3,486,999 sets forth apparatus for eliminating scale formation comprised of an anodic core of self sacrificing crystalline metal which decomposes over a long period of time while setting up polarization of the water through the release of energy due to the chemical decomposition reaction between the core and the water.

Yoshimine U.S. Pat. No. 3,597,668 sets forth a static charger for electrostatically charging liquid fuel upstream of the carburetor of an internal combustion engine.

Sanderson U.S. Pat. No. 4,050,426 treats liquid fuel for an internal combustion engine. The fuel is treated by connecting the apparatus in the fuel line leading to the carburetor. The apparatus comprises an outer casing of magnetic material and an inner casing of non-magnetic material positioned within the outer casing and an elongated magnet received within the inner casing. The magnet is arranged with the poles thereof oriented in a particular manner.

Roberts, et al U.S. Pat. No. 4,074,670; Masaki U.S. Pat. No. 4,173,260; and McMahan U.S. Pat. No. 4,373,494 show other means by which the hydrocarbon fuel flowing to an internal combustion engine is electrically modified to provide beneficial results during the combustion process.

Hence, there are many prior art references indicating that the fuel flow through an internal combustion engine can be advantageously treated by subjecting the fuel to various forms of electrical or chemical energy prior to the fuel entering the combustion chamber of the engine.

It has been discovered that when hydrocarbon fuel flowing to an internal combustion engine is brought into intimate contact with the crystalline alloy set forth in U.S. Pat. No. 3,448,034, the following unexpected advantages are realized:

(1) reduced pollution;
(2) increased performance;
(3) cleaner running combustion chamber;
(4) cleaner fuel flow apparatus downstream of the crystalline alloy.

It has been determined that this desirable and novel use of the crystalline alloy requires a small amount of the metal alloy arranged so that the hydrocarbon fuel flows in intimate contact therewith, whereupon the characteristics of certain fuel molecules are believed to be modified. An alloy having an exposed surface area of about eight square inches, when placed within a chamber and fuel is caused to flow into the chamber and across the alloy, provides the necessary treatment to obtain beneficial results at a flow rate of up to about two gallons per hour. This is sufficient treatment for most U.S. manufactured automobiles.

One explanation of the above advantages that can account for the improvement achieved with the present invention is that the crystalline metal, when brought into intimate contact with the hydrocarbons, causes certain hydrocarbons to undergo molecular orientation whereby the adjacent molecules are oriented respective to one another in a particular manner that enhances the complex combustion process to proceed in an advantageous manner toward more complete combustion. Assuming this hypothesis to be correct, it is easy to see that such a phenomena would indeed reduce pollution while at the same time providing more efficient combustion. The more efficient combustion lends itself to increased efficiency of operation as well as a cleaner running engine.

For many years the automobile industry has been searching for means to lower the emission of offensive exhaust gases from cars and trucks. These efforts include: improving engine performance, adjusting gasoline octane, adopting fuel injection systems, and the installation of catalytic converters in the exhaust train. The main objective has been to lower the amount of CO, NOx and SO2 compounds that accompany other gases in exhaust systems; because these pollutants are harmful to most living systems. They are controlled in many States by additional legislative restraints. Even though certain catalytic devices in exhaust systems have been shown to reduce the amount of pollutants in emissions, they are very costly and suffer from the undersirable effect of lowering gasoline mileage.

The development of the present invention provides apparatus that not only reduces pollutants in exhaust gases, but it also effectively cleans fuel-contacted engine areas so that an increase in engine performance is achieved. In some cases a ten percent increase in mileage has been observed after installing the apparatus.

SUMMARY OF THE INVENTION

The present invention consists of a special metal alloy housed in a metal pipe and installed anywhere in the fuel line of the vehicle. The metal alloy possesses a particularly unique property of affecting the fuel, either gasoline or diesel, in a manner such that more complete burning of the fuel is achieved. Not only are the amounts of various exhaust gases (hydrocarbon, carbon monoxide, etc.) diminished but the use of the tool prevents and/or removes deposited materials in the flow lines and fuel-contacted working parts of the engine. The result is a more efficient burning of the fuel, improved engine performance, and consequently better gasoline mileage.

More particularly, this invention comprehends an alloy which includes a mixture of copper, zinc, nickel, lead, tin, iron, antimony, sulfur, and manganese; each of which is present within a specific range of percentage composition. The alloy is placed within a housing and arranged so that hydrocarbon fuel for an internal combustion engine must flow through the housing and in intimate contact with the surface of the alloy.

The intimate contact of the fuel molecules with the alloy surface brings about an unexpected increase in the combustion efficiency of the internal combustion engine, causing significant reduction in pollution and increased mileage or power output. Specifically, the exhaust gases contain lower percentage of uncombusted hydrocarbons and CO when the present invention is employed in accordance with the teachings herein.

A primary object of the present invention is the provision of a fuel treatment for internal combustion engines which lowers pollution and increases the power output of the engine.

Another object of the present invention is the provision of an alloy arranged to be placed in a stream of hydrocarbons flowing to an internal combustion engine which modifies the fuel and thereby increases the combustion efficiency.

A further object of this invention is to disclose and provide an apparatus for changing the combustion process of an internal combustion engine comprising an alloy placed to be contacted by the hydrocarbon fuel flowing to the engine, said alloy includes copper, zinc, nickel, lead, tin, and can additionally include traces of iron, antimony, sulfur, and manganese.

An additional object of this invention is the provision of improvements in the combustion process of an internal combustion engine by flowing the fuel used by the engine in contact with a crystalline alloy comprised of a mixture of copper, zinc, nickel, lead, tin, and traces of iron, antimony, sulfur, and manganese.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a perspective view which sets forth an internal combustion engine connected to a fuel supply, with apparatus made in accordance with the present invention being associated therewith;

FIG. 2 is an enlarged, partial cross-sectional view of apparatus made in accordance with the present invention;

FIG. 3 is an enlarged, cross-sectional view taken along line 3—3 of FIG. 2;

FIG. 4 is a cross-sectional view of an alternate embodiment of the apparatus disclosed in FIGS. 1 and 2;

FIG. 5 is a cross-sectional view of another modification of apparatus made in accordance with the present invention;

FIG. 6 is a reduced side elevational view of another embodiment of the present invention, with some parts being removed therefrom to disclose the interior thereof; and, FIGS. 7-10 are plots of data showing the improvement derived from the use of the present invention.

DETAILED DESCRIPTION OF THE PREFERRED EMBODIMENTS

Figure 7:
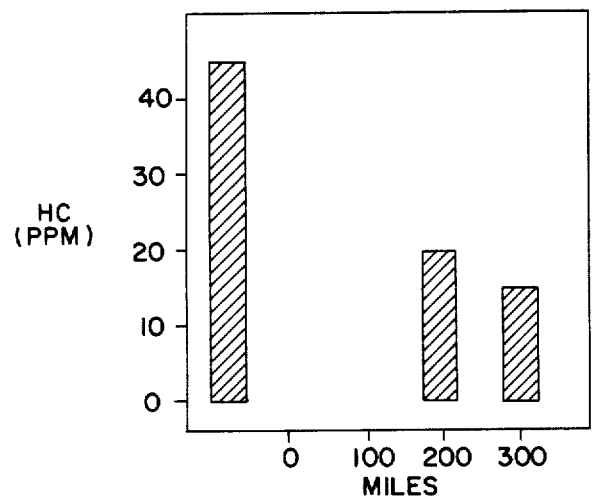

In the figures of the drawings, and in particular FIG. 1, there is disclosed a power unit 10, such as may be associated with a vehicle. The power unit is an internal combustion engine and includes a fuel tank 12 which may contain gasoline, diesel, or other liquid hydrocarbon fuels as may be appropriate for the demands of the power unit 10. Fuel line 14 is connected to a fuel pump 16, which can take on several different forms, depending upon the details of design of the internal combustion engine 10.

The fuel tank 12 has an outlet 18 to which the fuel line is connected. The internal combustion engine 10 can be of the type which uses diesel, gasoline, or other liquid hydrocarbon fuels.

Fuel treatment apparatus 20, made in accordance with the present invention, is connected to the fuel tank 12 and upstream of the pump 16 by means of the tank fuel outlet 18. The treatment apparatus 20 can instead be connected directly to the inlet 24 of carburetor 26 if desired. The fuel pump 16 is connected to the carburetor 26 by means of fuel line 22. In fact, the apparatus 20 can be connected anywhere in the fuel flow circuit as desired.

Accordingly, fuel from tank 12 flows through apparatus 20 and along fuel line 14, through fuel pump 16, through fuel line 22, and to the carburetor 24.

It should be understood that the fuel line 22 could equally well be connected to a fuel injection system. Furthermore, where the internal combustion engine 10 is a diesel powered engine, the fuel pump 16 and carburetor 26 would take on the form of a diesel fuel pump and diesel injection system, known to those skilled in the art.

FIGS. 2-6 of the drawings set forth the details of the treatment apparatus 20. In the first embodiment of the invention, as set forth in FIGS. 2 and 3, the treatment apparatus 20 comprises a special metal alloy contained within a suitable housing, with the alloy having the following percentage composition:

|           | Percent by weight: |
|-----------|--------------------|
| Copper    | 57.64              |
| Zinc      | 17.63              |
| Nickel    | 13.45              |
| Lead      | 7.66               |
| Tin       | 2.69               |
| Iron      | .69                |
| Antimony  | .12                |
| Sulfur    | .07                |
| Manganese | .05                |

In FIGS. 2 and 3, together with other figures of the drawings, there is set forth other embodiments of the invention that includes a treatment apparatus 20 having an inlet end 28 and an outlet end 30, formed by the illustrated pipe connections 32 and 34, which facilitates connection of the outer housing 36 in series relationship respective to fuel lines 14 or 22. The confronting ends 33, 35 of the connectors 32, 34 receive the opposed marginal ends 38 of housing 36 in sealed relationship therewithin. Shoulders 40 of each connector 32, 34 is formed at the end of a threaded passageway 42. This construction isolates the interior of the housing from ambient and provides a closed container within which an elongated crystalline element 44 can be suitably housed. The opposed ends 45 of the convoluted alloy element 44 are slightly spaced from the confronting shoulders 40 of connections 32, 34 so that fuel can flow into the inlet connector 28, through the annular area formed between the element 44 and interior of the housing, and out of the outlet connector 30 with an acceptable pressure drop due to friction flow thereacross. Numerals 46 and 48, respectively, indicate the hills and valleys formed longitudinally along the length of the crystalline alloy element 44.

As seen in FIG. 3, the alloy 44 is of a configuration which cooperates with the housing 36 to form a plurality of longitudinal flow passageways at 49 so that fuel flowing into and through the housing 36 contacts the entire exposed surface of the crystalline element 44 and thereby is brought into intimate contact with the alloy.

Throughout the figures of the drawings, wherever it is logical or desirable to do so, like or similar numerals will usually refer to like or similar elements.

In the embodiment of FIG. 4, the finned crystalline alloy element 144 is made hollow as indicated by numeral 50 so that additional surface area of the alloy is contacted by the flowing fuel, thereby more intimately bringing the fuel and the alloy into contact with one another. This liquid/solid contact is essential for achieving the desired results of this invention.

In FIG. 5, a plurality of parallel hollow crystalline alloy elements 52 are arranged in a close bundle and captured within housing 36. The tubular elements 52 each have an axial passageway 54 formed therethrough. Fuel flow occurs along longitudinal flow passageways 54 and 56.

In FIG. 6, the housing 36 contains a multiplicity of balls 58 made of the crystalline alloy described above, so that fuel flowing from inlet 28 through the interior of the housing and from outlet 30 is brought into intimate contact with the outer surface area of the multiplicity of balls.

The present apparatus is incorporated into a power plant 10 by series connecting the catalyst containing housing 36 into the existing fuel line at a location shown in FIG. 1, which alternatively includes a location downstream of the fuel pump and upstream of the injectors or carburetor 26. Fuel flowing from fuel tank 12 into the engine 10 therefore flows into the inlet 28, through the interior of the housing 36, where the fuel is placed in intimate contact with the special alloy 44 and thereby threats the fuel according to the present invention.

In FIGS. 2-4, the apparatus of the present invention includes a housing 36 within which an alloy member 44 is supported. The cross-sectional view of the alloy member is in the form of an extruded star having any number of points 46. A central passageway 50 can be included if desired. The points 46 preferably extend into close proximity respective to the inside peripheral wall surface of the housing 36, thereby dividing the housing into longitudinal flow passageways 49. The opposed ends of the points or ribs 46 abuttingly engage the confronting shoulders 40 of end connectors 32, 34. Fuel flowing from tank 12 flows through the passageways 49 as the fuel flows from the inlet 28 to the outlet 30 of the fuel treatment apparatus 20.

The metal alloy is non-sacrificial and will last as long as the vehicle to which it is attached if it is not damaged. In any event, the apparatus 20 will last several hundred thousand miles under ordinary conditions and if any of the metal alloy is used at all, the use or consumption thereof occurs very slowly. The alloy is non-magnetic and can be made into a number of different shapes or configurations as illustrated herein.

The apparatus 20 is an emission catalyst. The apparatus 20 causes electrostatic forces to be placed onto the molecules of the hydrocarbons as the fuel flows through the housing 20.

It was found that the copper, zinc, nickel, lead, tin, can be varied within the following ranges:

| copper | 40-66% | lead | 2-12% |
|--------|--------|------|-------|
| zinc   | 2-28%  | tin  | 1-5%  |
| nickel | 5-25%  |      |       |

The present invention does not provide the desired results when any one of the above components are deleted from the crystalline metal. The presence of a trace of iron, antimony, sulfur, and manganese appear to be an inherent part of the process used in manufacturing the alloy. These trace elements are believed not to be important but are included herein since they result from the alloying process.

Figure 8:
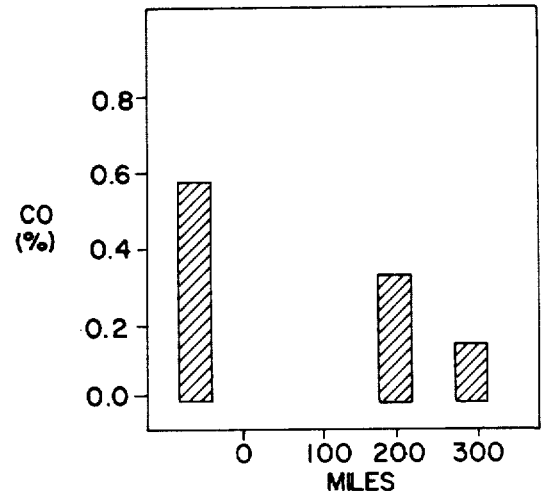

In FIGS. 7 and 8, there is disclosed a plot of the hydrocarbons (ppm) and carbon monoxide (%) present in the exhaust gas versus miles driven during a high cruise test. As seen in FIG. 7, the percent of hydrocarbons is greatly reduced after the present invention has been used on a vehicle for 300 miles. As seen in FIG. 8, the percent CO present in the exhaust gases is greatly reduced in a similar amount of mileage driven with the vehicle.

Figure 9:
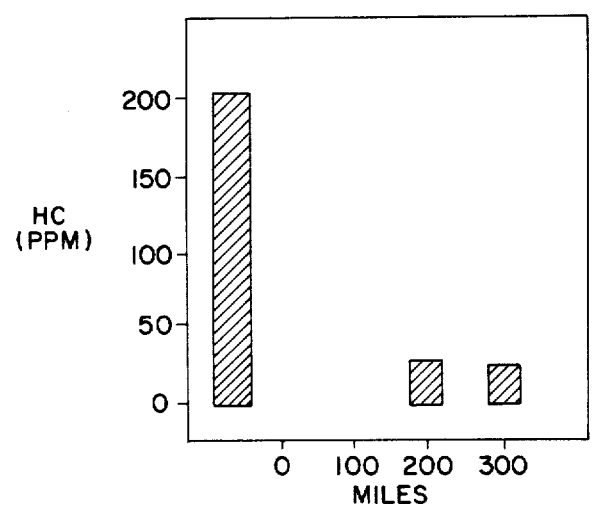
Figure 10:
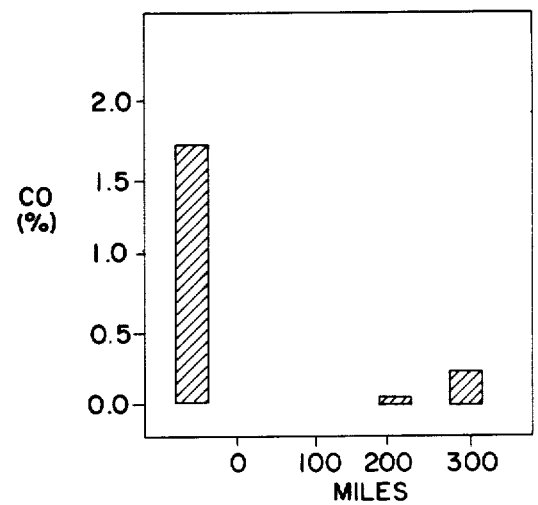

In FIGS. 9 and 10, there is disclosed a plot showing the hydrocarbons (ppm) and carbon monoxide (%) measured in the exhaust gas versus the miles driven during a test with the engine at idle speed. As seen in FIG. 9, the hydrocarbon is drastically reduced. FIG. 10 similarly shows a drastic reduction in the CO emissions.

The present invention is best appreciated when installed on a used car, for it clears up the exhaust in a few hundred miles and reduces the hydrocarbon and CO emission as seen in the plots of FIGS. 7-10. The graphs of FIGS. 7-10 show the test at both idle and at high speed, and show a large percent reduction in exhaust gas emission. After driving three hundred miles, for example, a decided improvement occurs in the exhaust emission. After 500 miles there is still greater improvement, which thereafter will reach a constant percentage improvement.

It has been found that the fuel itself is cleaned up as it flows through the apparatus 20. For example, cloudy diesel fuel is visibly cleaned when subjected to the apparatus of the present invention. Where the present invention is installed on an internal combustion engine that has been used for several thousand miles, the spark plugs will show improved cleanliness as the vehicle is then further driven with the present invention. Hence, it is evident that the hydrocarbon fuel is modified while flowing through the apparatus 20 so that the exhaust emission is cleaned up to a more desirable percentage composition.

It has been discovered that a further improvement in exhaust gas emission is achieved when alcohol (ethyl) based fuel is used in accordance with this invention. That is, 5-10% ethanol mixed with gasoline contained within tank 12 and treated at 20 provides an unexpected improvement in the exhaust gas emissions at 11.

Broadly the present invention comprises lowering pollutants in exhaust gases of an internal combustion engine by flowing the hydrocarbon fuel in intimate contact with an alloy comprised of copper, zinc, nickel, lead, and tin.

More specifically, said invention comprises an alloy having the following range of composition:

| copper | 40-66% | lead | 2-12% |
|--------|--------|------|-------|
| zinc   | 2-28%  | tin  | 1-5%  |
| nickel | 5-25%  |      |       |

Still more specifically, the above alloy further includes the trace elements: iron, antimony, sulfur, and manganese present in the following range:

| iron      | 0.2-0.9% | manganese | 0.01-0.09% |
|-----------|----------|-----------|------------|
| antimoney | 0.5-1.5% | sulfur    | 0.02-0.12% |

A specific example of the preferred alloy used in this invention is:

|           | Percent by Weight: |
|-----------|--------------------|
| copper    | 57.64              |
| zinc      | 17.63              |
| nickel    | 13.45              |
| lead      | 7.66               |
| tin       | 2.69               |
| iron      | .69                |
| antimony  | .12                |
| sulfur    | .07                |
| manganese | .05                |

I claim:

1. Method of operating an internal combustion engine comprising the steps of:
   placing a housing in series relationship respective to fuel flow to said engine so that the fuel flows through the housing;
   encapsulating at least one alloy member within said housing so that the fuel flowing through the housing is brought into contact with the surface of the alloy;
   said alloy member consists of a mixture of the following metals: copper, zinc, nickel, lead, and tin;
   said mixture has the following range of composition: copper 40-66%; zinc 2-28%; nickel 5-25%; lead 2-12%; and tin 1-5%.

2. The method of claim 1 and further including the step of making said housing cylindrical, providing said alloy member with elongated ribs circumferentially arranged thereabout and telescopingly received within said housing so that the ribs of the alloy member are positioned closely adjacent to the interior wall of the housing.

3. The method of claim 1 wherein there is included a plurality of alloy members, each member being elongated and extending along a line which is parallel to the longitudinal axis of the housing.

4. The method of claim 1 wherein each member is hollow.

5. The method of claim 1 wherein the following trace elements are included in said alloy: iron, antimony, sulfur, and manganese.

6. The method of claim 1 wherein each member is a ball, there being a plurality of balls contained within said housing.

7. The method of claim 2 wherein said engine is a diesel engine.

8. The method of claim 5 wherein said engine is a diesel engine.

9. Method of lowering the undesirable exhaust emissions while increasing the combustion efficiency of an internal combustion engine comprising the steps of:
   placing a housing in series relationship respective to a fuel line that supplies fuel to the internal combustion engine;
   supporting at least one alloy member in captured relationship within said housing;
   said alloy member being a crystalline metal alloy consisting of:

| copper | 40-66% | lead | 2-12%    | antimony  | 0.5-1.5%    |
|--------|--------|------|----------|-----------|-------------|
| zinc   | 2-28%  | tin  | 1-5%     | sulfur    | 0.02-0.12%  |
| nickel | 5-25%  | iron | 0.2-0.9% | manganese | 0.01-0.09%. |

10. The method of claim 9 and further including the step of making said housing cylindrical, said alloy member is elongated and is telescopingly received within said housing; so that flow passageways are formed along the sides of the alloy member.

11. The method of claim 9 and further including the steps of placing a plurality of elongated alloy members circumferentially about the longitudinal axis of the housing.

12. The method of claim 11 and further including the step of making each member hollow.

13. The method of claim 9 and further including the step of making each member into a ball, there being a plurality of balls contained within said housing.

14. The method of claim 9 wherein said engine is a diesel engine.

15. A fuel treatment apparatus for connection in series relationship within a fuel line of an internal combustion engine comprising:
   a housing having a inlet end and an outlet end;
   at least one crystalline metal alloy member supported within said housinq so that fuel flowing through the housing is contacted by the surface of the alloy member;
   said crystalline metal alloy member consists of: copper, zinc, nickel, lead, iron, antimony, sulfur, manganese, and tin having the following range of composition for said alloy member; copper 40-66%; zinc 2-28%, nickel 5-25%; lead 2-12%; tin 1-14%; iron 0.2-0.9%, antimony 0.5-1.5%; sulfur 0.02-0.12%; and manganese 0.01-0.09%.

16. The apparatus of claim 15 wherein said housing is cylindrical, said alloy member is elongated and is telescopingly received within said housing with the sides of the alloy member being spaced from the interior wall of the housing.

17. The apparatus of claim 15 wherein there are a plurality of alloy members, each member being elongated and extending along a line which is parallel to the longitudinal axis of the housing.

18. The apparatus of claim 15 wherein said engine is a diesel engine.

* * * * *

UNITED STATES PATENT AND TRADEMARK OFFICE
CERTIFICATE OF CORRECTION

PATENT NO. : 4,715,325
DATED : DECEMBER 29, 1987
INVENTOR(S) : CLAUD W. WALKER

It is certified that error appears in the above-identified patent and that said Letters Patent is hereby corrected as shown below:

Column 4, line 39, substitute --26-- for "24";

Column 5, line 57, substitute --treats-- for "threats";

Column 7, line 27, correct the spelling of "antimony";

Signed and Sealed this

Fifth Day of July, 1988

Attest:

DONALD J. QUIGG

Attesting Officer

Commissioner of Patents and Trademarks